United States Patent [19]

Schwaderer et al.

[11] Patent Number: 5,238,221
[45] Date of Patent: Aug. 24, 1993

[54] PLUG-IN COUPLING FOR HOSES

[75] Inventors: Christian Schwaderer, Leutenbach; Peter Langer, Schwaikheim, both of Fed. Rep. of Germany

[73] Assignee: Alfred Karcher GmbH & Co., Winnenden, Fed. Rep. of Germany

[21] Appl. No.: 776,241

[22] PCT Filed: May 17, 1990

[86] PCT No.: PCT/EP90/00792
§ 371 Date: Nov. 8, 1991
§ 102(e) Date: Nov. 8, 1991

[87] PCT Pub. No.: WO90/15281
PCT Pub. Date: Dec. 13, 1990

[30] Foreign Application Priority Data

Jun. 2, 1989 [DE] Fed. Rep. of Germany ....... 3918021

[51] Int. Cl.⁵ .............................................. F16K 31/00
[52] U.S. Cl. ...................................... 251/89; 251/354; 285/86; 285/316
[58] Field of Search ............... 251/149.1, 149.6, 149.8, 251/149.9, 89, 354; 285/82, 86, 91, 315, 316, 319

[56] References Cited

U.S. PATENT DOCUMENTS

| | | | |
|---|---|---|---|
| 2,631,872 | 3/1953 | Wurmser | 285/316 X |
| 2,855,946 | 10/1958 | MacKal | 251/354 X |
| 3,588,149 | 6/1971 | Demler et al. | 285/307 X |
| 3,858,910 | 1/1975 | Oetiker | 251/354 X |
| 4,260,130 | 4/1981 | Brehm | 251/354 X |
| 4,561,682 | 12/1985 | Tisserat | 285/305 |
| 4,591,192 | 5/1986 | Van Exel et al. | 285/306 X |

Primary Examiner—Martin P. Schwadron
Assistant Examiner—Kevin L. Lee
Attorney, Agent, or Firm—Barry R. Lipsitz

[57] ABSTRACT

In order to improve the operating capabilities of a plug-in coupling for hoses comprising a sleeve, into which a hose stem can be sealingly inserted, a U-shaped, elastically deformable locking element which is held on the sleeve for displacement at right angles to its longitudinal axis and engages with its two arms behind a projection on the hose stem and hereby prevents its withdrawal, and wedge surfaces arranged on the sleeve, on which the two arms of the locking element abut and which spread these arms elastically apart during displacement of the locking element to such an extent that the hose stem is released, it is suggested that the locking element be formed by a U-shaped housing which has an upper wall and two side walls and surrounds the sleeve essentially over its entire length, that the arms be projections formed on the side walls and that the upper wall of the housing be designed as a pressure surface.

10 Claims, 1 Drawing Sheet

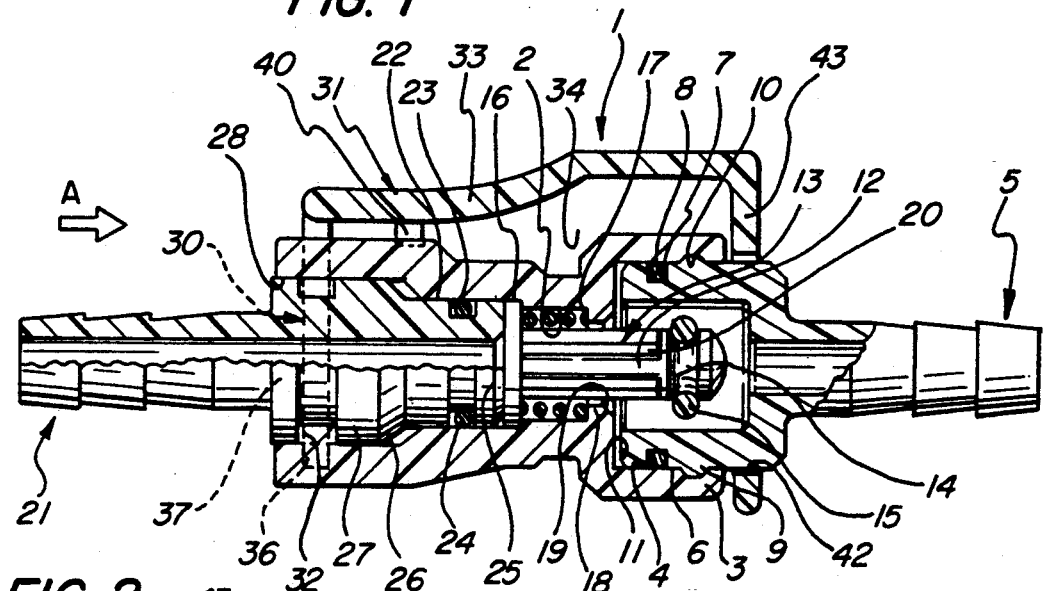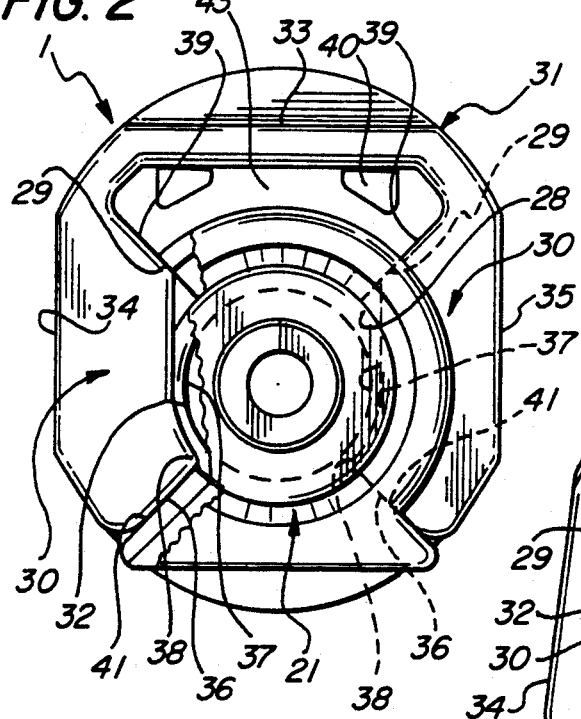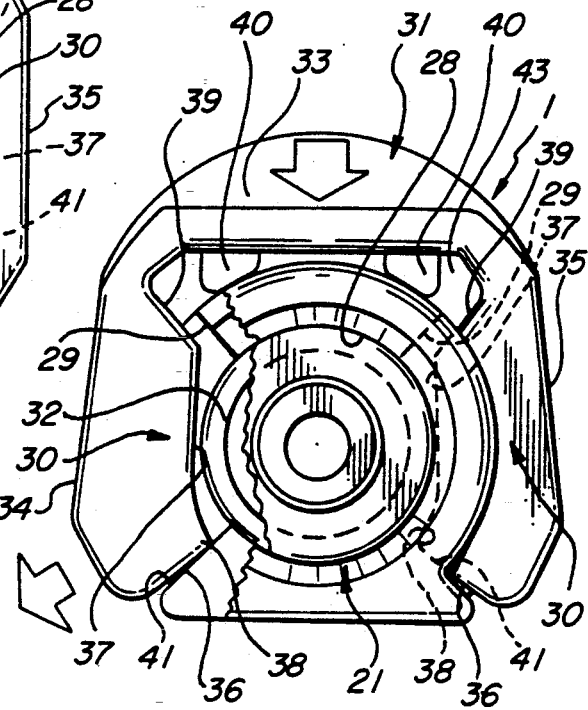

PLUG-IN COUPLING FOR HOSES

The invention relates to a plug-in coupling for hoses comprising a sleeve, into which a hose stem is sealingly insertable, a U-shaped, elastically deformable locking element held on the sleeve for displacement at right angles to its longitudinal axis, this locking element engage with its two arms behind a projection on the hose stem and thereby preventing its withdrawal, and wedge surfaces arranged on the sleeve, the two arms of the locking element abutting on these wedge surfaces and being spread elastically apart by the wedge surfaces during displacement of the locking element to such an extent that the hose stem is released.

A plug-in coupling for hoses of this type is known from DE-OS 34 40 753. The locking element is, in this case, designed as a narrow bracket, the crosspiece of which penetrates through a groove extending over a portion of the circumference of the sleeve. Due to this construction, the user has only a small pressure surface for displacement of this locking element and so operation is made more difficult Moreover, the crosspiece of the bracket-like locking element must protrude beyond the outer circumferential surface of the sleeve and so not only are sharp edges formed but parts which are movable relative to one another are exposed and can perhaps be actuated unintentionally.

The object of the invention is to develop a generic plug-in coupling further so that these disadvantages are avoided and a simplified operation is possible This object is accomplished according to the invention, for a plug-in coupling for hoses of the type described at the outset, in that the locking element is formed by a U-shaped housing with an upper wall and two side walls, which surrounds the sleeve essentially over its entire length, that the arms are projections formed on the side walls and that the upper wall of the housing is designed as a pressure surface.

With this construction, the sleeve is surrounded again by a housing, which has substantially smooth outer surfaces so that no sharp edges or parts movable against one another are arranged on the outside. Moreover, the entire upper wall of the housing can be used as a pressure surface and so the user of the coupling can release the parts inserted into one another in a simple manner due to pressure on the upper wall of the housing. This substantially simplifies operation and it is no longer necessary to search for the appropriate pressure surface.

It is particularly advantageous for the arms of the housing to engage in lateral slots of the sleeve and hereby mount the housing on the sleeve so as to be non-displaceable in the longitudinal direction but displaceable transversely thereto. The housing is held on the sleeve merely by this engagement of the arms in the slots. Apart from being secured in position in axial direction, the housing is also secured against any tilting relative to the longitudinal axis of the sleeve. The slots engaging in the arms therefore form a sliding guide means for the housing, by which the housing is displaceable only in one plane at right angles to the longitudinal axis of the sleeve.

In this respect, it is possible, in particular, for the arms to be adapted to be elastically bent out to such an extent that they exit out of the slots in the sleeve. Due to the arms being bent out, the housing can be separated again from the sleeve, or rather housing and sleeve can, in the reverse case, be assembled by the housing being elastically pushed onto the sleeve and the arms then locking into the slots due to their intrinsic elasticity.

It is particularly favourable for the projections to be inwardly protruding, strip-like wall regions These can, in particular, be designed as parts of an end wall.

The housing can also be closed on the opposite side by means of an end face which has a through opening for a hose connection coaxial to the longitudinal axis of the sleeve. In this way, the housing is additionally supported when the hose connection is inserted since it surrounds the hose connection like a ring. This does not prevent a displacement of the housing relative to the sleeve since the relative paths of displacement of the housing and the sleeve are extremely slight and since the opposite end wall surrounding the hose connection acts like a hinge mounting for the housing.

In a preferred embodiment, a spring-loaded check valve is arranged in the sleeve and this valve is displaceable into an open position contrary to the spring force by means of the inserted hose stem. When the hose stem is withdrawn, the plug-in coupling is therefore closed.

Sealed hose stems can be inserted into the sleeve on both sides.

In this respect, it is possible for one hose stem to be secured in position in the sleeve so as to be non-displaceable in axial direction by means of the elastically bendable arms of the housing, the other by means of an elastic detent or snap connection.

In a further arrangement, it is, however, also possible for the housing to bear bendable arms at both end, whereby a pair of arms is associated each time with each of the hose stems.

The following description of preferred embodiments of the invention serves to explain the invention in greater detail in conjunction with the drawings In the drawings, FIG. 1 is a longitudinal sectional view through a preferred embodiment of a plug-in coupling with inserted hose stems;

FIG. 2: is a view in the direction of arrow A in FIG. 1 in a partially broken open illustration with the arms in the closed position and FIG. 3: is a view similar to FIG. 2 with the arms in the release position.

The plug-in coupling for hoses illustrated in the drawings comprises a sleeve 1 with a through inner bore 2 which narrows in steps towards the center.

At one end 3, this inner bore 2 forms a cylindrical insert opening 4 for a hose stem 5, which abuts with a sealing surface 6 on the inner wall of the insert opening 4. For the purpose of sealing, an annular seal 8 is inserted into a circumferential groove 7 in the sealing surface 6. The sealing surface 6 also has circumferential ribs 9 which, during insertion of the hose stem 5, engage into corresponding circumferential grooves 10 in the inner wall of the insert opening 4. This secures the hose stem 5 in position in axial direction after insertion. It can, however, be withdrawn out of the sleeve 1 again with correspondingly large axial force, the ribs 9 hereby exiting from the circumferential groove 10 due to elastic deformation.

The insert opening 4 is limited at its base by an inwardly projecting step 11. The shaft 12 of a valve body 13, which bears at one end an annular seal 15 in a circumferential groove 14 and at the other end an annular surface 16 protruding outwardly beyond the shaft 12, is mounted for longitudinal displacement in the inner bore 2 which has a correspondingly smaller diameter in this region. The annular surface 16 abuts at its outer edge on the inner wall of the inner bore 2 which is broadened in this region. A helical spring 17 surrounding the shaft 12 is supported on the annular surface 16. The other end of the spring abuts on a radial projection 18 of the inner bore 2 and the spring attempts to remove the valve body 13 from the insert opening 4. Under the influence of this helical spring 17 the valve body 13 is displaced to such an extent until the annular seal 15 abuts on a conical edge 19 of the inner bore 2 exiting from the insert opening 4, this conical edge being designed as a valve seat. This means that the passage through the inner bore is closed.

If the valve body 13 is displaced contrary to the action of the helical spring 17, the annular seal 15 is lifted away from the edge 19 so that a passage for flow through the inner bore 2 is made possible. For this purpose, the shaft 12 is hollow in design, at the end bearing the annular surface 16 it is open at the end face, the inner chamber of the shaft 12 communicates with the outer chamber through openings 20 in the casing. The valve body is illustrated in FIG. 1 in its through-flow position.

An additional hose stem 21 is insertable into the inner bore 2 from the side remote from the insert opening 4 and this hose stem bears an annular seal 24 in a circumferential groove 23 in a cylindrical sealing surface 22. This annular seal abuts sealingly on the inner wall of the inner bore 2, the end edge 25 of the hose stem 21 abuts on the annular surface 16 of the valve body 13 and displaces this into the through-flow position illustrated in FIG. 1.

A conically widening slide surface 26 follows the sealing surface 22 of the hose stem 21 on the side remote from the end edge 25. This surface 26 ends in a cylindrical guide surface 27. This abuts with its entire area on the broadened inlet region 28 of the inner bore 2 when the hose stem is inserted.

The sleeve 1 has in the inlet region 28 two slots 29 extending over a portion of the sleeve circumference and connecting the inner bore 2 with the outer chamber. Two arms 30 of a housing 31 engage from outside through these slots 29, these arms protruding inwardly into the inlet region 28 and there engaging in a circumferential groove 32 in the guide surface 27 of the hose stem 21 and thereby securing the latter in position in axial direction.

The housing 31 is U-shaped in design in cross section and has an upper wall 33 as well as two side walls 34 and 35 adjoining this upper wall and protruding vertically downwards. The housing extends over the entire length of the sleeve 1 and surrounds this on three sides whereas the lower side of the sleeve 1 is open. The arms 30 are strip-like wall portions formed on the front edge of the two side walls 34 and 35 and protruding inwards at right angles. These wall portions end at their lower ends in upwardly inclined slide edges 36. Inwardly protruding projections 38 are formed on the inner edges 37 of the two arms, which extend essentially parallel to the side walls 24, in the area of transition to the slide edges 36. The distance between these projections 38 on the two arms 30 is, when the arms are not deformed, less than the outer diameter of the hose stem 21 in the region of the circumferential groove 32.

On the upper side, the arms 30 end in an outwardly and upwardly inclined edge 39.

The two slots 29 in the sleeve 1 are arranged such that the distance between the slots, on their circumferential side, and the upper end of the sleeve is greater than the distance between the projections 38 of the two arms 30 as long as the arms 30 are not deformed. In order to insert the arms 30 into the slots 29 it is therefore necessary to spread the arms 30 elastically apart. This is possible because the housing 31 is formed of an elastic material, in particular a flexible plastic. At the end bearing the arms 30, the housing 31 is not provided with an end wall; the arms are formed exclusively on the side walls 34 and 35. This means that it is easily possible to elastically bend the side walls out at this end. Due to such bending out, it is possible to have the arms 30 entering the slots 29, both the slide edges 36 and the upper edges 39 of the arms 30 hereby abutting on the ends of these slots 29 and thereby securing sleeve and housing in position relative to one another. Any relative movement can only be achieved by deforming the housing and elastic bending thereof.

If the housing is displaced upwardly relative to the sleeve, the arms are bent out in that the upper edges 39 of the arms abut on the end of the slots 29. This makes it possible to separate housing and sleeve.

If, on the other hand, the housing is pressed against the sleeve, the arms 30 are also bent out by the abutment of the slide edges 36 on the lower ends of the slots 29 so that the inner edges 37 and the projections 38 are moved away from one another. These normally protrude inwards into the inlet region 28 and thereby engage in the manner described in the circumferential groove 32 of the inserted hose stem 21. If the arms 30 are, however, elastically bent apart in the manner described, they exit out of the circumferential groove 32 so that the hose stem 21 can easily be withdrawn from the sleeve 1.

In order to prevent the arms from being bent out too far, the housing can bear spacer means 40 on the inside of the upper wall 33, which abut on the outer side of the sleeve 1 when the housing is pressed onto the sleeve. It is also favourable when the lower end faces of the slots 29 continue in a reinforced flaring surface 41 which is also inclined like the slide edges 36 and formed in one piece on the sleeve 1. This avoids any excessive wear and tear on the small end faces of the slots 29. The upper wall 33 and the underside of the sleeve 1 can be designed as pressure surfaces so that sleeve and housing can be pressed against one another easily with one hand.

Like the housing, the remaining parts of this coupling can also be produced from plastic.

Such a coupling is very simple to assemble. First of all, the valve body 13 surrounded by the helical spring 17 is pushed into the sleeve from one side and the annular seal 15 is then mounted from the other side onto the valve body after insertion. This sleeve 1 is then connected with the housing 31 in that the latter is simply pressed from above onto the sleeve. In this respect, the arms 30 are spread apart to such an extent until they lock into the slots 29. The hose stem 5 is pushed into the insert opening 4, through a through opening 42 in an end wall 43 closing the housing on the side opposite the arms 30, until the ribs 9 engage in the circumferential groove 10. The hose stem 5 can be connected in a manner known per se with a hose not illustrated in the drawings.

This means that the plug-in coupling is ready for operation. For connection with another hose end which bears the hose stem 21, this hose stem 21 is pushed into the inlet region 28 of the sleeve. The end edge 25 of the hose stem 21 hereby displaces, in the manner described, the valve body 13 into the through-flow position. Moreover, the arms 30 projecting inwardly through the slots 29 slide along the slide face 26 until they elastically engage in the circumferential groove 32. The hose stem 21 is then sealed relative to the sleeve 1 and held in the sleeve so as to be axially non-displaceable.

To release this hose coupling it is sufficient to press the housing 31 against the sleeve 1 This causes the arms to be spread apart to such an extent that the hose stem 21 is withdrawable out of the sleeve 1. At the same time, the valve body 13 is displaced due to the action of the helical spring 17 into its closed position, in Which the annular seal 15 abuts sealingly on the edge 19 formed as a valve seat.

We claim:

1. A hose coupling comprising:
   a sleeve having a longitudinal axis;
   wedge surfaces arranged on said sleeve;
   a hose stem sealingly insertable into said sleeve; and
   an elastically deformable locking element held on said sleeve for displacement at right angles to said longitudinal axis, said locking element comprising:
      a U-shaped housing for surrounding said sleeve essentially over its entire length and having an upper wall designed as a pressure surface with two side walls extending therefrom, said side walls having two arms projecting therefrom at a first end thereof and being closed at a second end thereof remote from said first end by means of an end face having a through opening for a hose connection coaxial with said longitudinal axis;
   wherein the two arms of said locking element (i) engage behind a projection on said hose stem to prevent withdraw of the hose stem and (ii) abut said wedge surfaces for being spread elastically apart by the wedge surfaces during displacement of said locking element to release said hose stem.

2. A hose coupling as defined in claim 1, characterized in that a spring-loaded check valve is arranged in the sleeve, this valve being displaceable into an open position contrary to the spring force by the inserted hose stem.

3. A hose coupling as defined in claim 1, characterized in that the arms of the housing engage in lateral slots of the sleeve and thereby mount the housing on the sleeve so as to be non-displaceable in the longitudinal direction but displaceable transversely thereto.

4. A hose coupling as defined in claim 3, characterized in that the arms are adapted to be elastically bent open to such an extent that the arms exit from the slots of the sleeve.

5. A hose coupling as defined in claim 1, characterized in that the arms are inwardly projecting, strip-like wall regions.

6. A hose coupling as defined in claim 1, characterized in that sealed hose stems are insertable into the sleeve on both sides.

7. A hose coupling as defined in claim 6, characterized in that one hose stem is secured in position in the sleeve so as to be non-displaceable in an axial direction by means of the elastically bendable arms of the housing, the other by means of an elastic detent or snap connection.

8. A hose coupling as defined in claim 6, characterized in that the housing bears bendable arms at both ends, a pair of arms being associated each time with each of the hose stems.

9. A hose coupling as defined in claim 3, characterized in that the arms are inwardly projecting, strip-like wall regions.

10. A hose coupling as defined in claim 4 characterized in that the arms are inwardly projecting, strip-like wall regions.

* * * * *